United States Patent [19]

Merritt

[11] 4,250,663
[45] Feb. 17, 1981

[54] PROPAGATOR FOR GROWING AND TRANSPLANTING PLANTS

[75] Inventor: Leonard G. Merritt, Watford, England

[73] Assignee: Merrittstyle Products Limited, Watford, England

[21] Appl. No.: 959,747

[22] Filed: Nov. 13, 1978

[30] Foreign Application Priority Data

Aug. 21, 1978 [GB] United Kingdom ............... 34062/78

[51] Int. Cl.³ .............................................. A01G 9/10
[52] U.S. Cl. ........................................... 47/73; 47/77; 47/86; 206/557; 220/4 E
[58] Field of Search ................... 47/73, 75, 77, 85, 86, 47/87; 294/50.8; 206/564, 561, 558, 557; 220/4 E

[56] References Cited

U.S. PATENT DOCUMENTS

| 92,198 | 7/1869 | Lyman | 294/50.8 |
|---|---|---|---|
| 366,776 | 7/1887 | Johnson | 47/85 |
| 3,513,594 | 5/1970 | Hasselbach | 47/73 |
| 3,534,862 | 10/1970 | Shambelan | 206/564 |
| 3,849,932 | 11/1974 | Adams | 47/73 |
| 4,023,691 | 5/1977 | Perel | 206/564 |
| 4,057,932 | 11/1977 | Spencer | 47/85 |

FOREIGN PATENT DOCUMENTS

| 264974 | 10/1913 | Fed. Rep. of Germany | 294/50.8 |
|---|---|---|---|
| 56526 | 7/1911 | Switzerland | 294/50.8 |
| 566529 | 1/1945 | United Kingdom | 47/73 |
| 668757 | 3/1952 | United Kingdom | 47/73 |

*Primary Examiner*—Steven A. Bratlie
*Attorney, Agent, or Firm*—Blanchard, Flynn, Thiel, Boutell & Tanis

[57] ABSTRACT

A propagator for growing and transplanting young plants comprises a container which is for receiving a growing medium and which has walls which can be moved away from the growing medium when transplanting takes place, the whole container being placed in a prepared trough or furrow prior to the removal of the walls without disturbing the root systems of the young plants being transplanted.

The container may be supported by a support stand, or it may be free standing.

3 Claims, 14 Drawing Figures

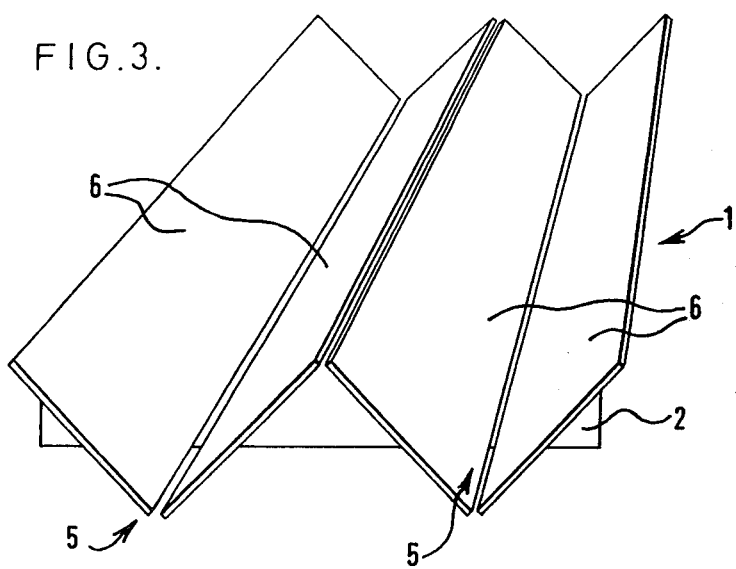
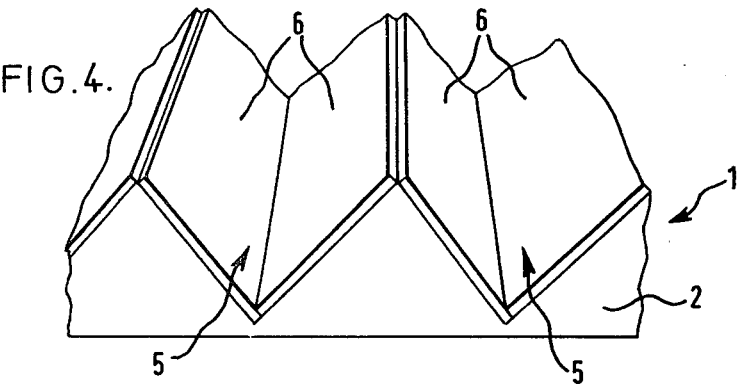
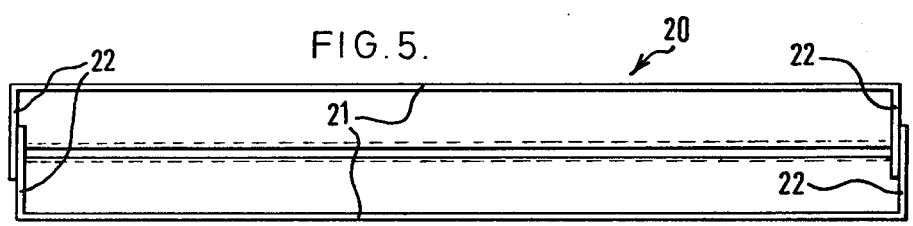

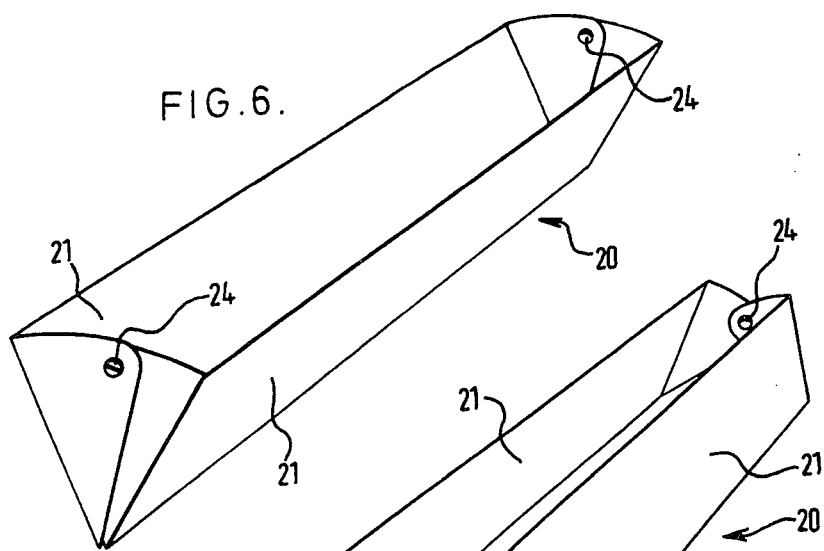
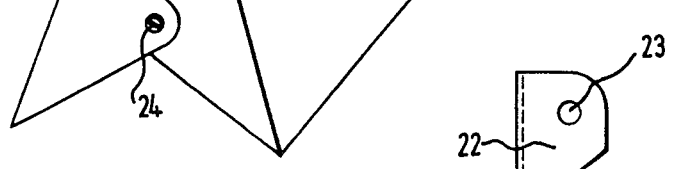
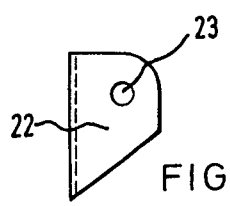
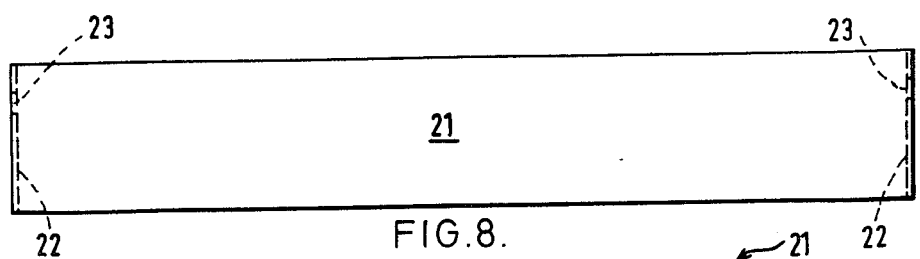
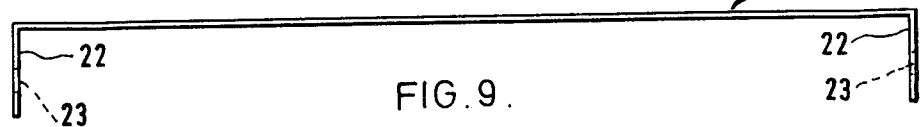

PROPAGATOR FOR GROWING AND TRANSPLANTING PLANTS

TECHNICAL FIELD OF THE INVENTION

The invention relates to propagators for growing and transplanting plants, and concerns such a propagator comprising a container, for receiving a medium for growing the plants, which has spaced walls.

BACKGROUND ART

Plants, particularly when grown from seeds, are often grown under controlled desired environmental conditions in a seed tray or propagator in a green house or cloche in order to establish their root systems and to provide a healthy young plant. The young plants are often then transplanted from the seed tray to open ground in for example a garden or allotment. To accomplish this the young plants have to be removed from the seed trays, known ones of which are usually wooden or plastics trays. During this removal, the roots systems of the plants are liable to be damaged because it is not easy to lift the young plants from the trays. This is particularly the case with root vegetables such as carrots, parsnips, turnips, beetroot and the like. Such root vegetables have delicate root systems and it is important that their root systems are undisturbed in order that the young plants can grow into mature healthy plants without retardation of growth brought about to root system damage. This tendency to damage plants means that they often cannot be grown under favourable conditions which reduces the crop per acre, and can result in a mature plant of relatively poor quality.

DISCLOSURE OF THE INVENTION

It is accordingly an object of the invention to mitigate the disadvantages of the known propagators.

According to the invention there is provided a propagator for growing and transplanting plants, comprising a container, for receiving a medium for growing the plants, which has spaced walls characterized in that said walls are movable away from the medium so that the medium is relatively undisturbed when the plants are transplanted.

The walls may each have end flanges, and flanges of the wall may overlap to close an end of the container. In this way a relatively simple container that can be handled relatively easily is obtained.

The flanges may be connected together, preferably by pivotal means, so that the walls may be pivoted towards and away from one another. This construction enables the walls of the container to be moved easily yet carefully away from the root system so that that system is not damaged.

The walls may be mutually arranged to form a V-configuration, which is advantageous for transplanting plants into a V-shaped trough or furrow previously formed in the ground to receive young plants being transplanted.

Although the propagator may be free-standing, there may preferably be a support stand of such a shape and configuration that it can support the (or several) container(s) during growth of the young plants in a green-house or cloche. Such a stand enables the propagator(s) to be stored or stacked safely. In order to minimise space, there may be means for stacking containers vertically, one on another, and such means may comprise a spigot projecting from each corner of an upper surface of the stand and sockets in the under surface, each socket being for receiving one spigot.

The propagators may include carrying means, for example a carrying handle at opposite ends of the containers, and/or at opposite sides of the support stand.

Propagators embodying the invention are hereinafter described, by way of example, with reference to the accompanying drawings, in which:

BRIEF DESCRIPTION OF THE DRAWINGS

FIG. 3 shows a top elevational view of the propagator of FIG. 2;

FIG. 4 shows an enlarged end view of the propagator;

FIG. 5 shows a top plan view of a second container of a propagator;

FIGS. 6 and 7 show to a larger scale respective closed and open views of the container of FIG. 5;

FIGS. 8, 9 and 10 show underneath plan, side elevational and end elevational views of the container of FIGS. 5 to 7.

BEST MODES FOR CARRYING OUT THE INVENTION

Figure 1:
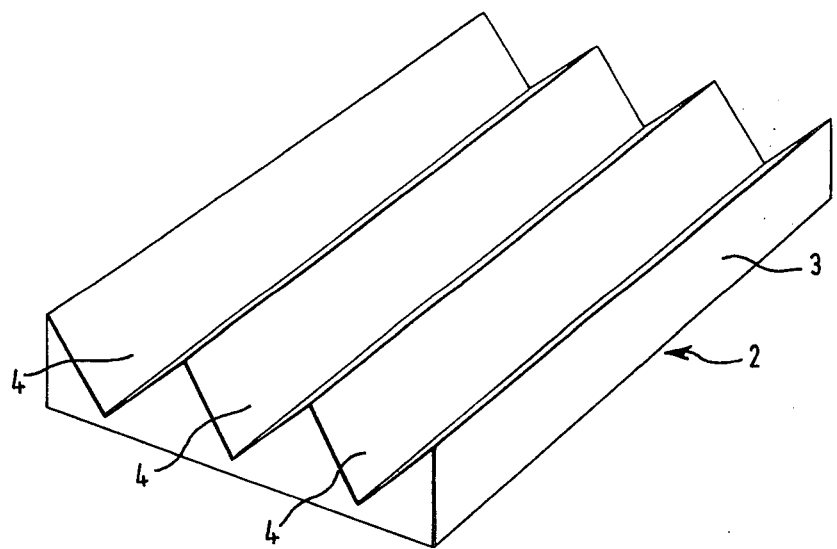
FIG. 1 shows a perspective view of a support stand for one propagator.
Figure 2:
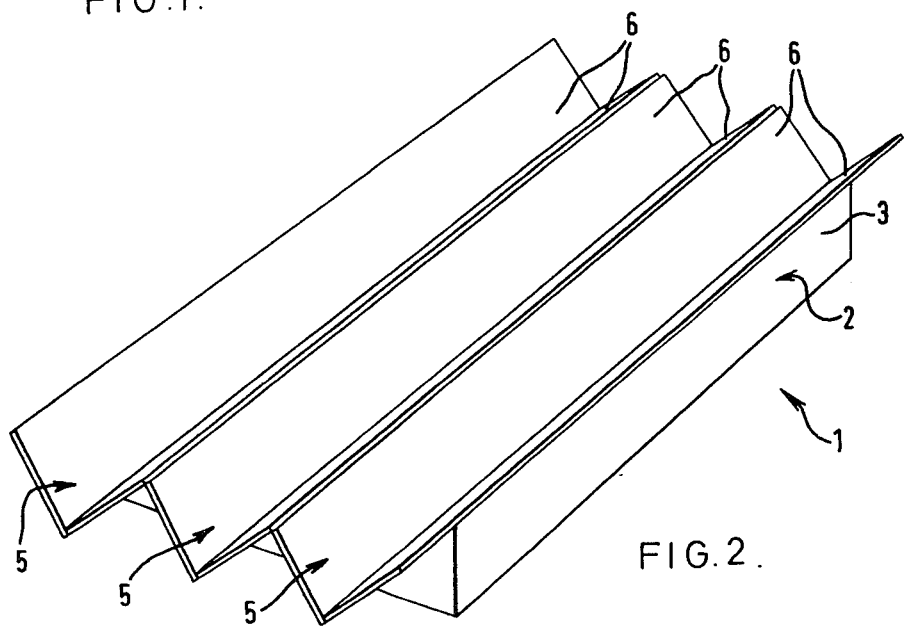
FIG. 2 shows the support stand of FIG. 1 with three containers in position.

Referring firstly to FIGS. 1 to 4 of the drawings, the propagator 1 shown comprises a support stand 2 (FIG. 1) which has a box like body 3 with an upper surface which has three parallel troughs 4 of V-configuration, in each of which a container 5 (FIGS. 2 to 4) is supported. Each container 5 comprises two planar walls 6 of a suitable material such as aluminium, plastics or wood which lie in the troughs 4 against a particular wall of the trough 4.

In use of the propagator 1, the container walls 6 are laid in the troughs 4 and filled with a suitable growing medium (not shown) for the particular seeds to be propagated. The seeds (or seedlings) are then sown at suitable desired spacings along the troughs, and they are allowed to develop, in a green-house or cloche, until they reach a mature enough state to be transplanted to a final growing location. At this stage of development, the propagator 1 is moved outside, where troughs have previously been formed in the ground. The containers 5 are then lifted from the support stand and each one is laid in a prepared trough, which will, it will be understood, be of a sufficient size to receive the container 1. When the container is in the trough, the walls 6 are gently eased away from the growing medium and lifted from the trough in the ground and from the growing medium.

The growing medium is thus transplanted, with the young plants and the root systems of those plants are not disturbed.

Referring now to FIGS. 5 to 10, the containers 20 are similar except that each wall 21 has an end flange 22 extending laterally of it. There is a hole 23 through each flange 22, and the walls 21 are arranged so that the flanges 22 overlap with their holes 23 aligned, securing means such as a nut and bolt 24 being inserted through the holes 23 for securing the walls 21 together, but allowing them to pivot from the position shown in FIG. 6 to that shown in FIG. 7, and vice versa.

The second embodiment of propagator is used in a similar way to the first one, except that in order to transplant the young plants, the walls 21, when in the prepared trough or furrow, are pivoted apart to the open position shown in FIG. 7 from the closed or growing position of FIG. 6, before being lifted from the trough or furrow in the ground and so leaving the root systems undisturbed.

Figure 11:
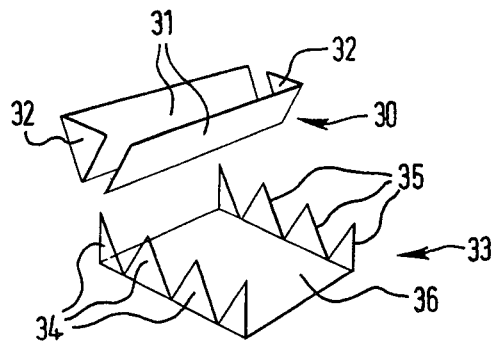
FIGS. 11 to 14 show to a relatively smaller scale a third propagator and its use.
Figure 12:
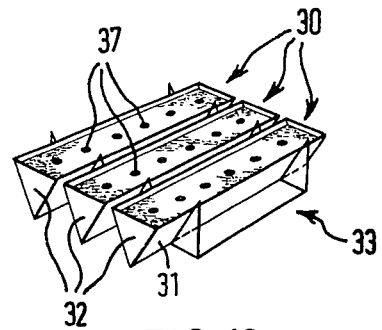
Figure 13:
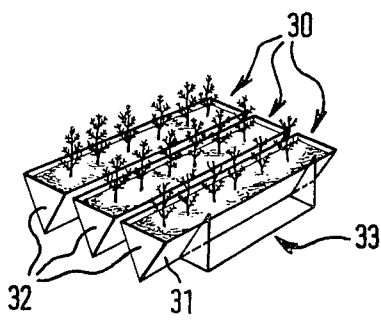
Figure 14:
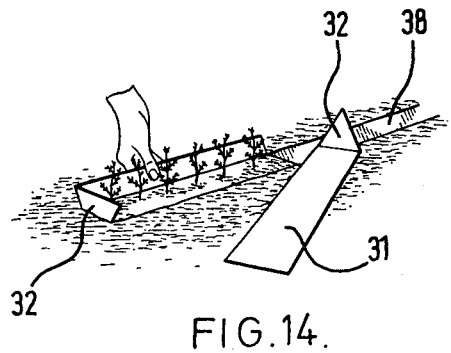

With respect to FIGS. 11 to 14, each container 30 consists of two halves which fit together to form a V-shaped propagating trough. Each half comprises a metal wall 31 and a single end flange 32. In use, the respective flanges are opposite and parallel to close the ends of the trough. The halves are identical, however, so that the two halves can be formed from sheet metal or from plastics in a forming machine set up to produce identical halves which are used in pairs. The propagator also includes a support stand or holding frame 33. The holding frame 33 shown holds three containers 30 (see FIG. 12). The holding frame has upstanding opposite flanges 34 and 35 adjacent pairs of which define a V-shaped recess in which a container 30 is supported. The flanges 34 and 35 are deeper than the containers 30 so that when the containers are in position the tips of the flanges 34 and 35 stand proud, so that a base 36 of another holding frame can be supported over the lower frame 30. In this way, a propagator comprising troughs 30 and holding frames 33 can be stacked one on another, so saving valuable green-house space.

In use, the empty troughs are mounted on the holding frame by inserting the container halves in a V-shaped recess of the holding frame.

Each V-trough or container 30 is filled with suitable growing compound, say earth or peat to, for example, ½" from the top. Seeds, bulbs or seedlings 37 are then placed in the compound at the same distance apart that they are to be in a garden. When the plants have grown to a suitable height, say 2" or 3", FIG. 13, V-shaped furrows 38 are dug in the ground, large enough and long enough to take all the troughs 30. The furrows are watered. The frames 33 are carried from the greenhouse or propagating room and the first trough 30 is lifted out and is gently placed in the furrow 38 so that it fits sungly. Each half 31, 32 of the container 30 is then gently removed, one at a time, from the furrow, leaving the healthy young plants in their growing compound in the trough.

It will be understood that the support stands may be made of wood, wire, or plastics such as polystyrene and may have a corrugated surface for receiving the containers.

It will also be understood that the propagators shown in the drawings and above described may be modified in several ways. For example, the walls 6, 21 may take any mutual configuration other than V-shaped, for example they may be parallel in the vertical sense, in which case the support stands would have a complementary shaped surface. Further the containers and/or the support stands may have carrying handles. Again, the support stands or the containers may have means enabling them to be stacked one on top of another. Finally, although the containers have been shown and described in combination with a support stand, they may be free-standing if the walls are provided with depending legs which keep them in the required position during use.

I claim:

1. A propagator for growing and transplanting plants, comprising:

a container for receiving a growing medium and which can be dismantled when full of growing medium without disturbing that medium, said container comprising a first and a second boundary wall, said first and second boundary walls being identical and each comprising a rectangular side wall and a single triangular end wall which extends from the side wall at right angles to said side wall, said end wall being at one end of said side wall, whereby when said first and second boundary walls are assembled with said side walls opposed and with said end walls spaced apart and substantially parallel and each abutting the side wall of the other one of said first and second boundary wall said container is formed with an upwardly open interior of V-shaped cross section, each boundary wall being independently movable from the other one of said boundary walls at all times; and support stand means having a V-shaped recess complementary to the shape of the container whereby the boundary walls of the container can be supported by the support stand means in a desired configuration to form the container.

2. A propagator as defined in claim 1, wherein said support stand means has means for stacking, whereby two or more of said containers can be stacked vertically one on top of another.

3. A propagator as defined in claim 2, wherein said stacking means comprises pointed wall means of said support stand means which painted wall means project upwardly beyond an upper edge of said container when said container is supported in said support stand means.

* * * * *